March 24, 1964  O. R. BRINEY, JR., ET AL  3,125,903
ECCENTRIC BORING HEAD
Filed Oct. 26, 1960
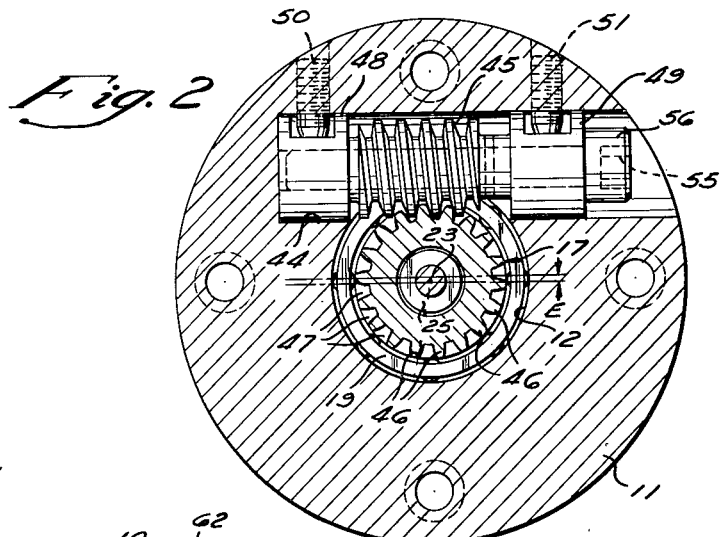
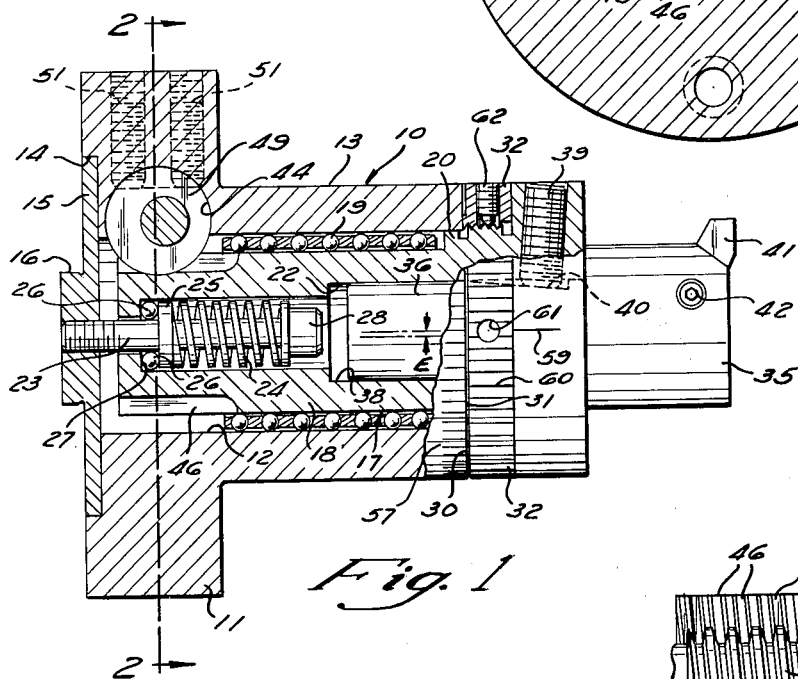
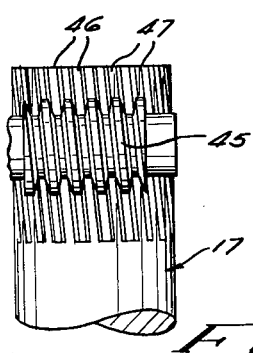
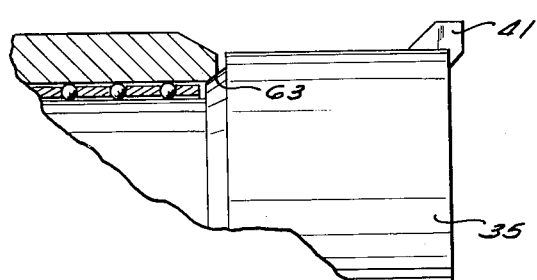
INVENTORS
OTIS R. BRINEY JR.,
& JAMES W. BRINEY
BY
WATTS, EDGERTON, PYLE & FISHER
ATTORNEYS

United States Patent Office 3,125,903
Patented Mar. 24, 1964

3,125,903
ECCENTRIC BORING HEAD
Ottis R. Briney, Jr., and James W. Briney, Pontiac, Mich., assignors to Briney Manufacturing Company, Pontiac, Mich., a corporation of Michigan
Filed Oct. 26, 1960, Ser. No. 65,078
5 Claims. (Cl. 77—58)

This invention relates broadly to cutting tool holders of the type known as boring bars, and more specifically to an improved adjustable boring, turning and facing tool holder construction.

In United States Patent No. 2,558,815 a mechanism is shown in which an eccentric sleeve is disposed between a boring bar and a housing with an anti-friction bearing disposed on either side of the sleeve. This has been a highly satisfactory arrangement for obtaining very precise cutting tool adjustments. However, with a simplified structure the present invention obtains precision which is as good as the patented device, and better in many cases. The better precision is obtained because a thicker and sturdier shank and boring bar can be used. At the same time, because of the elimination of the eccentric sleeve, the diameter of the entire device can be made smaller so it will go through smaller spaces. The construction also allows smaller diameter bolt circles for fastening the boring head on machine spindles.

One of the principal objects of the present invention is the provision of a bar journaled eccentrically in an anti-friction high-precision bearing carried by the body and the provision of a gear at the end of the bar and a mating worm to adjust and drive the boring bar.

Another object of the invention is the provision of a boring head made in accordance with the preceding object in which the coaction of the worm and the gear together with the friction between the end of a housing hub and the boring bar keeps the bar in an exact adjusted setting.

An additional object of the invention is to provide a tool with an eccentrically mounted boring bar in which a worm and gear arrangement is provided to obtain eccentric adjustment of the bar and in which a spring biases the bar inwardly relative to the supporting hub to maintain longitudinal position locating surfaces on the bar and hub in abutment with one another.

A related object of the invention is to provide a novel and improved boring tool with a hub member and an eccentrically mounted boring bar member biased into position by a spring in which an adjustment ring is threaded onto one of the members and abuttable with the other of the members to shift the members relatively longitudinally against the biasing of the spring.

Further objects of the invention reside in the provision of a boring tool in which a boring bar is held eccentrically in a body, which tool is efficient of operation, economic of manufacture, and a tool which may be accurately adjusted with ease and dispatch.

Other objects and advantages more or less ancillary to the foregoing, and the manner in which all the various objects are realized, will appear in the following description which, considered in connection with the accompanying drawings, sets forth the preferred embodiment of the invention.

Referring to the drawings:

FIGURE 1 is a side elevational view of the device with parts broken away and removed and shown in section;

FIGURE 2 is a sectional view of the device as seen from the plane indicated by the line 2—2 of FIGURE 1;

FIGURE 3 is a top plan view of the gear end of a boring bar support member and a mating adjusting worm; and FIGURE 4 is a fragmentary view of a portion of a slightly modified boring quill.

Referring to the drawings, a housing hub is shown at 10. The hub 10 has a radially projecting end mounting flange 11 provided at its inner or mounting end. The hub 10 has a through, preferably cylindrically contoured, bore 12. The bore 12, for reasons which will be explained in greater detail below, is eccentric with respect to circular outer surface 13 of the hub 10.

At the mounting flange end of the hub 10, a counterbore 14 is provided. A circular pilot flange 15 is disposed in the counterbore 14 and secured to the hub 10. The pilot flange 15 includes a pilot boss 16 which is concentric with respect to the circular surface 13 and the mounting flange 11, but eccentric with respect to the bore 12.

A boring bar 17 is provided. The boring bar support 17 includes a shank 18 which is a reduced diameter mounting portion. The mounting portion is cylindrically contoured and is disposed within the hub bore 12. An anti-friction bearing 19 is disposed in the bore 12 and interposed between the hub 10 and the mounting portion 18.

The boring bar support 17 includes an annular sealing shoulder 20 which overlies the outer end of the bearing 19. The shoulder 20 is in a dirt sealing, sliding fit with the bore 12. The shoulder 20 prevents the imposition of the shock loads on the bearing 19.

The support 17 has a through bore 22. A bar retention shaft in the form of a bolt 23 is secured to the pilot flange 15 and projects into the support bore 22. A biasing spring 24 is interposed between a thrust washer 25 and head 28 of the bolt 23. The spring 24 urges the thrust washer 25 against a plurality of thrust ball bearings 26. The thrust ball bearings 26 in turn act against an inwardly projecting, annular thrust flange 27 which is part of the support 17 and which is provided at the inner end of the bore 22.

The biasing of the spring 24 urges the boring bar support 17 inwardly, maintaining bar support abutment surface 30 in tight, annular abutting contact with outer end surface 31 of the hub 10. The coaction of these surfaces 30, 31, together with the coaction of the shoulder 20 and the hub bore 12, provides a very effective dirt and coolant seal.

The support abutment surface 30 is the inner face of an annular, longitudinal adjustment ring 32 which is threaded onto the boring bar support 17. Adjustment rotation of the adjustment ring 32 will shift the support 17 back and forth axially against the action of the spring 24 and relative to the hub 10.

A boring bar 35 is provided. The bar 35 has a shank 36 which is disposed in an enlarged end portion 38 of the support bore 22. A set screw 39 is provided which acts against a tapered bar positioning surface 40 formed on the shank 36. When so secured together the support and the bar can be considered as a unit and identified as a boring bar. For clarity of description they have been described as the separate members which they are in the preferred and disclosed construction. A cutter 41 is secured to the boring bar 35 as by set screw 42.

The boring bar support 17 and its connected boring bar 36 are rotatively adjustable relative to the hub 10. A transverse bore 44 is provided which is in communication with the hub bore 12. The transverse bore 44 is formed in the hub 10 and preferably at least in part within the mounting flange 11. To obtain micrometer relative rotation for adjustment, a worm 45 is journaled in the transverse bore 44. A plurality of longitudinally extending gear teeth 46 are provided at the inner end of the bar support 17. Preferably the teeth 46 are formed by milling a plurality of longitudinally extending gear teeth grooves 47 within the contour generated in the cylindrical surface of the support portion 18 of boring bar support 17. With this arrangement a very strong and very small diameter gear is provided. This gear is in engagement with the worm 45 so that rotation of the worm will cause rotation of the boring bar support 17 and the connected boring bar 36. The gear may be either a spiral or a worm gear, depending upon the angle of the worm relative to the bar support 17.

The worm 45 is journaled in eccentric bearings 48, 49 which are positioned in the transverse bore 44. Pairs of adjustment screws 50, 51 act respectively against adjustment surfaces on the eccentrics 48, 49. By manipulating the adjustment screws 50, 51, the worm 45 may be brought into tight, backlash-free engagement with the gear 46.

Since the hub bore 12 is eccentric with respect to the pilot boss 16, it is also eccentric to the axis of rotation of the entire assembly. The boring bar 36 and the boring bar holder 17 are concentric, but since they are journaled in the eccentric bore 12, they are also eccentric with respect to the axis of assembly rotation. This eccentricity is indicated at E.

With the boring bar 35 eccentric with relation to the axis of rotation of the entire assembly, the cutter 41 will be moved to a different radial distance from the axis of rotation when the boring bar 36 is rotated. This rotation is obtained by inserting a suitable tool, such as an Allen wrench, in an aperture 55 provided in head 56 of the shaft connected to the worm 45. Thus, when the worm 45 is rotated, the boring bar 17 will rotate and the cutter 41 will be shifted to a different radial distance from the axis of assembly rotation.

The outer end of the hub 10 has spaced graduations 57. These graduations are brought into registration with a line known as a witness mark or setline 59 formed on the boring bar support 17. The annular adjustment ring 32 is also graduated at 60. The annular adjustment ring 32 is rotated by inserting a spanner wrench in apertures 61. Rotating this ring 32 shifts the bar holder 17 and the connected bar 36 against the action of the spring 24, while the worm 45 prevents rotation of the bar support 17 relative to the hub 10. This adjustment of the threaded ring 32 provides appropriate longitudinal location of the cutter 41 to control the depth of a cut in a machining operation.

This longitudinal adjustment of the bar is possible because the gear teeth 46 have a longitudinal extent of substantially constant depth. The worm 45 is able to slide relative to the gear teeth 46 when the longitudinal adjustment is made, and proper rotational adjustment contact is still present no matter what endwise adjustment position is selected.

The threaded engagement of the adjustment ring 32 and the boring bar support 17 preferably has high enough friction to prevent accidental relative rotation of the two upon rotational adjustment of the boring bar and hub. Set screw 62 may be provided to prevent this slippage. The operator can, however, discern whether or not there has been any slippage by watching the witness mark 59 and the graduations 60 as he makes his radial cutter adjustment by rotating the worm 45.

FIGURE 4 shows a slightly modified form of the invention in which the adjustment ring 32 and the shoulder 20 are eliminated. The bar and the hub have mating, tapered surfaces shown at 63. The surfaces provide a dirt and coolant seal for the bearing and takes excess shock pressure off the bearing 19. In all other respects the device of FIGURE 4 is the same as the device of FIGURES 1 through 3. The elongated teeth 46 are provided. The teeth facilitate the assembly of the device, simplify the manufacture by permitting looser tolerances, and compensate for wear in the assembly as it is used.

From the foregoing it will be seen that the preloaded, anti-friction bearing will facilitate the rotation of the eccentrically held bar holder with ease and dispatch, while maintaining very accurate positioning of the bar. Further, the worm and gear will accommodate accurate adjustment as well as serve to drive the bar holder while not interfering with the novel longitudinal adjustment provided.

Although the invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention as hereinafter claimed.

What is claimed is:

1. A metal working tool comprising, a hub member having a through bore extending from a work end to a mounting end, said hub member having a radially projecting mounting flange at said mounting end, said hub member having a counterbore at said mounting end, a pilot flange disposed in said counterbore and including locating means projecting rearwardly therefrom and disposed eccentrically with respect to said bore, a boring bar support member having an outer support end and a shank portion disposed in the bore and terminating at an inner adjustment end, said shank portion having a plurality of longitudinally disposed gear teeth grooves extending from the inner adjustment end forwardly toward the support end and defining a plurality of gear teeth therebetween, a worm journaled in the hub member and in longitudinally slidable engagement with the gear teeth, an anti-friction bearing interposed between said shank portion and said bore and disposed forwardly of said worm, one of said members including an annular sealing shoulder between said bearing and said outer end and overlying the bearing in sealing, sliding abutment with the other member, said members being first and second members, a retention shaft secured to the first member and having an enlarged head, annular thrust means disposed around said shaft, biasing means interposed between the thrust means and the head and urging the thrust means into engagement wtih the second member, and a boring bar carried by the boring bar support member.

2. A metal working tool comprising, a hub having a through bore extending from a work end to a mounting end, said hub having a radially projecting mounting flange at said mounting end, locating means secured to the hub and projecting rearwardly therefrom and disposed eccentrically with respect to said bore, a boring bar support having an outer support end and a shank disposed in the bore and terminating at an inner adjustment end, said shank portion having a plurality of longitudinally disposed gear grooves extending from the inner adjustment end forwardly toward the support end and defining a plurality of longitudinally extending gear teeth, a worm journaled in the hub and in longitudinally slidable engagement with the gear teeth, an anti-friction bearing interposed between said shank portion and said bore and disposed forwardly of said worm, said support having a through bore with a reduced diameter end annular flange adjacent the support inner end, a retention shaft secured to the hub and projecting into said support bore, said shaft having an enlarged head disposed in the support bore, a thrust ring disposed around said shaft, biasing means interposed between the thrust ring and the head, thrust balls interposed between the thrust ring and the annular flange, a spring interposed between the thrust ring and the head and urging the balls into abutment with the flange, and a boring bar carried by the boring bar support.

3. The device of claim 2 wherein said gear teeth are within the contour generated by said shank.

4. A metal working tool comprising, a hub having a through bore extending from a work end to a mounting end, said hub having a radially projecting mounting flange at said mounting end, said hub having a counterbore at said mounting end, a pilot flange disposed in said hub counterbore and including a pilot boss projecting rearwardly therefrom and disposed eccentrically with respect to said hub bore, a boring bar support having an outer boring bar support end and a shank disposed in the hub bore and terminating at an inner adjustment end, said shank having a plurality of longitudinally disposed gear grooves extending from the inner adjustment end forwardly toward the boring bar support end, said grooves defining a plurality of longitudinally extending gear teeth disposed within the contour generated by said shank, said mounting flange having a transverse bore formed therein and communicating with the hub bore, a pair of eccentrics adjustably mounted in the transverse bore, a worm journaled in the eccentrics and in longitudinally slidable engagement with the gear teeth, an anti-friction bearing interposed between said shank and said hub bore and disposed forwardly of said worm, said bar support including an annular sealing shoulder between said bearing and said boring bar end overlying the bearing and in sealing, sliding abutment with said hub bore, an adjustable collar threaded into said support and in abutment with the end of said hub, said support having a through bore, a bolt threaded into the pilot flange and projecting into the support bore, the bolt having an enlarged head, said support including an inwardly directed annular flange defining the inner end of the support bore, a thrust ring disposed around said bolt, a spring interposed between the thrust ring and the head, and thrust balls interposed between the thrust ring and the thrust flange, and a boring bar mounted on the boring bar support.

5. A metal working tool comprising:
 (a) a hub member having a through bore extending from a work end to a mounting end;
 (b) said hub having a projecting mounting portion at said mounting end, said hub having a counterbore at said mounting end;
 (c) a pilot flange disposed in said counterbore and including locating means projecting rearwardly therefrom and disposed eccentrically with respect to said hub bore;
 (d) a boring bar support having an outer support end and a shank portion disposed in the hub bore and terminating at an inner adjustment end, said shank portion having a plurality of longitudinally disposed gear teeth grooves extending from the inner adjustment end forwardly toward the support end and defining a plurality of gear teeth therebetween;
 (e) a worm journaled in the hub and in longitudinally slidable engagement with the gear teeth;
 (f) an anti-friction bearing interposed between said shank portion and said hub bore and disposed forwardly of said worm;
 (g) said support including a through longitudinally extending stepped bore having a small diameter portion adjacent the inner end of the support, a large diameter bar receiving portion adjacent the support end, and an intermediate diameter portion connecting the small and large portions;
 (h) a bolt in threaded engagement with the pilot flange, projecting through the small portion, and having a head in the intermediate portion;
 (i) a spring around the bolt, abutting the head, and in the intermediate portion and biasing the support inwardly into the hub;
 (j) said support including a shoulder connecting the small and intermediate portions of the support bore; and
 (k) thrust means between the spring and the shoulder.

References Cited in the file of this patent

UNITED STATES PATENTS

| | | |
|---|---|---|
| 2,780,467 | Jackson | Feb. 5, 1957 |
| 2,833,169 | Briney et al. | May 6, 1958 |
| 2,867,031 | Briney et al. | Jan. 6, 1959 |
| 2,931,254 | Briney et al. | Apr. 5, 1960 |
| 2,957,362 | Kelm | Oct. 25, 1960 |

FOREIGN PATENTS

| | | |
|---|---|---|
| 770,287 | Great Britain | Mar. 20, 1957 |